Patented Jan. 19, 1937

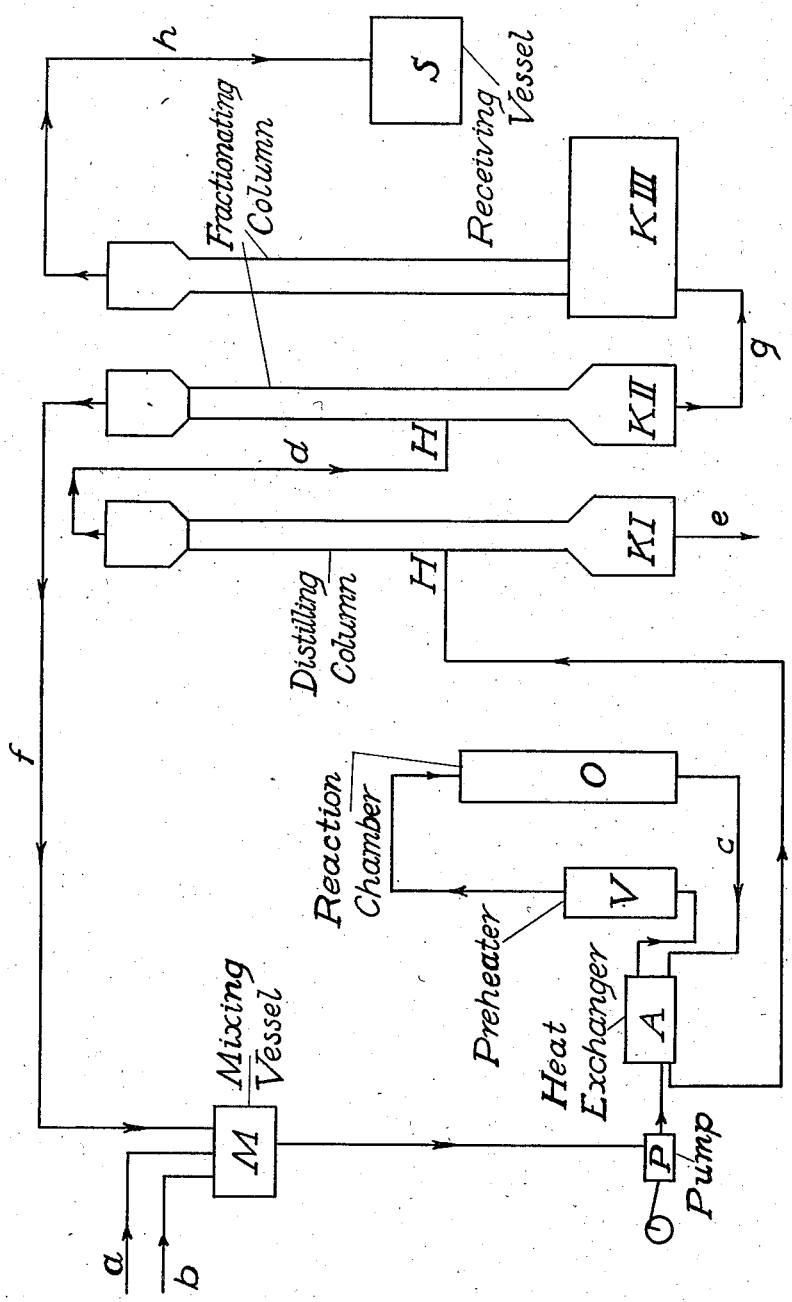

2,068,132

UNITED STATES PATENT OFFICE 2,068,132

PRODUCTION OF MONOMETHYLAMINE AND DIMETHYLAMINE

Paul Herold and Karl Smeykal, Leuna, Germany, assignors to I. G. Farbenindustrie Aktiengesellschaft, Frankfort-on-the-Main, Germany Application April 11, 1934, Serial No. 720,041 In Germany April 19, 1933

6 Claims. (Cl. 260—127)

The present invention relates to a process of producing monomethylamine and dimethylamine.

It is already known that by the catalytic conversion of methanol and/or dimethyl ether with ammonia at elevated temperatures, the three methylamines are formed and that the relative proportions thereof are dependent inter alia on the relative proportions of methanol and ammonia.

In practice, however, for the most purposes the primary amine is mainly desirable while there is scarcely any use for the tertiary amine. The excess of ammonia which per se is advantageous for the formation of the primary amine, is, however, limited having regard to the economy of the process and other means must be adopted to promote the formation of the primary amine. It has already been proposed to return the undesired bases, especially the tertiary amine, to the process in order to hinder any fresh formation of these compounds. On the other hand it is also known that the simplest and most economical separation of the three amines, namely distillation, only proceeds when carried out in the presence of large amounts of ammonia. Only in this way can the tertiary amine be separated from the other two because it then distils off in the form of a constant boiling point binary mixture with ammonia at a temperature considerably below its proper boiling point and that of the other amines.

We have now found that monomethylamine and dimethylamine can be obtained in a pure anhydrous form in an especially economical method on an industrial scale by carrying out a cyclic process having the following characteristics:

From 5 to 6 parts by volume of a liquid mixture of ammonia and trimethylamine having a somewhat smaller content of trimethylamine than corresponds to the composition of the constant boiling point (azeotropic) mixture of ammonia and trimethylamine and which therefore contains less than from about 19 to 20 per cent by weight of trimethylamine, are mixed with 1 part by volume of a liquid mixture of 10 parts by volume of methanol and about 6 parts of liquid ammonia. Per each volume of methanol usually between about 6 to about 10 volumes of liquid ammonia and per each volume of liquid dimethyl ether between about 7 to about 12 parts by volume of liquid ammonia are employed. The excess in ammonia over the azeotropic mixture of ammonia and trimethylamine is usually between about 40 and 150 per cent by weight. This mixture is led in the form of vapor continuously at elevated temperature, preferably under high pressure, with such a speed over catalysts splitting off water that practically no methanol remains in the reaction product; the reaction product is cooled, the pressure is released to about 15 atmospheres and the reaction product worked up under the said pressure by repeated fractional distillation as described in our copending application Ser. No. 720,042 of even date herewith, whereby first the water is separated from all the bases and subsequently the different bases are separated from one another. In this manner an anhydrous mixture of ammonia and bases is intermediately obtained which contains less tertiary amine relative to its ammonia content than is necessary for the formation of the constant boiling point (azeotropic) mixture of the two components. Consequently in the further distillation a mixture of monomethylamine and dimethylamine free from trimethylamine which may be readily split up into its components by further distillation is obtained on the one hand, and on the other hand a mixture of ammonia and trimethylamine which contains all the trimethylamine and in such a concentration that the mixture may all be returned to the conversion thus rendering the process a continuous cycle. In this manner there are withdrawn from the said cyclic process only the valuable monomethylamine and dimethylamine. The whole of the methanol introduced and all the freshly added ammonia are used practically completely for the formation of the said bases, there being no waste by reason of the formation of worthless byproducts. It has been found that the said process operating in a closed cycle may be carried on for months without trouble. That the combination of the two phenomena, namely the complete prevention of the formation of trimethylamine from the methanol and ammonia employed on the one hand and the convenient separation of the trimethylamine while making use of the formation of an azeotropic mixture with ammonia on the other hand, should be so favorable and that it should render possible a completely closed cyclic process certainly could not be foreseen. On the contrary it would have been expected that the necessary concentration of trimethylamine in the ammonia passed in cycle for the prevention of the formation of more trimethylamine would be considerably greater than that in the azeotropic mixture so that for the distillation a special addition of ammonia, as has already been proposed, would be necessary. Such an addition of ammonia would have rendered a closed cycle impossible and the process complicated because the amount of ammonia supplied to the cycle would have to be continually washed so that a part would have to be branched off, loss of yield of methanol and ammonia by reason of the trimethylamine contained in the branched-off ammonia being unavoidable.

The catalytic conversion is carried out with catalysts splitting off water at elevated temperatures, usually between about 300° and about 450° C. and preferably under increased pressure. It is advantageous to carry out the reaction according to our copending application Serial No. 720,040 of even date herewith at pressures above 50 atmospheres and with a large excess of ammonia.

The most essential feature of the present invention resides in the employment of distinct proportions of the materials to be treated; the process permits one to carry out the production of mono- and dimethylamine in a continuous cycle for long periods, for example many months, without any loss of material and without troublesome separation of undesired byproducts. The only reaction products, mono- and dimethylamine, are obtained in a very pure form.

The following example given with reference to the accompanying drawing will further illustrate the nature of this invention but the invention is not restricted to this example or to the particular arrangement shown. The parts are by volume.

*Example*

6 parts of liquid ammonia are introduced at $a$ and 10 parts of methanol at $b$ into a mixing vessel M under a pressure of 11 atmospheres. 90 parts of liquid ammonia-trimethylamine mixture containing 12 per cent by weight of trimethylamine from the head of the distilling column KII enter vessel M through $f$. The three components are well mixed and then passed by means of a pump P through a heat-exchanger A in which they are vaporized by indirect contact with hot reaction gases and into a preheater V in which they are heated to 380° C. The vapor mixture then passes into the reaction chamber O containing a catalyst consisting of alumina gel. The vaporization, heating and reaction take place under a pressure of 200 atmospheres. The vaporous reaction product leaving the reaction chamber O at $c$ gives up most of its heat to the initial mixture in the heat-exchanger A, thereby being liquefied; after the pressure has been released to 12 atmospheres, the mixture is introduced at H into a distilling column KI continuously operated under the said pressure. The lower part of this column is kept at 170° C. The water formed in the reaction and small amounts of unconverted methanol are continuously withdrawn at $e$.

A practically anhydrous mixture of ammonia and the three methylamine bases continuously leaves the head of the column KI and passes through a pipe $d$ at H into a fractionating column KII working continuously under a pressure of 11 atmospheres.

The lower part of this column is kept at 52° C. A mixture of ammonia and 12 per cent by weight of trimethylamine continuously leaves the upper end of the column and flows back through a pipe $f$ to the mixing vessel M and is employed as already described.

A liquid mixture of monomethylamine and dimethylamine and a little ammonia which is practically free from trimethylamine leaves the lower part of the column KII at $g$. The splitting up of the same into a small amount of first runnings which may be further employed in the mixing vessel M and high percentage monomethylamine and high percentage dimethylamine is effected in a column KIII by careful fractional distillation periodically.

The process may be carried on for months without trouble and without other than the said products, namely water, monomethylamine and dimethylamine, leaving at the said places.

What we claim is:—

1. The process of producing methylamines containing from 1 to 2 methyl groups in the molecule by catalytically reacting, at a temperature between about 300° and about 450° C. in the vapor phase, ammonia with a compound of the formula $CH_3—O—R$, R being one of the group consisting of hydrogen and methyl, which comprises adding before the reaction to each part by volume of the starting material mixture (measured while liquid) from 5 to 6 parts by volume (measured while liquid) of an ammonia-trimethylamine-mixture containing less trimethyl-amine than the azeotropic ammonia-trimethylamine mixture.

2. The process of producing methylamines containing from 1 to 2 methyl groups in the molecule by catalytically reacting, at a temperature between about 300° and about 450° C. in the vapor phase, ammonia with a compound of the formula $CH_3—O—R$, R being one of the group consisting of hydrogen and methyl, which comprises adding before the reaction to each part by volume of the starting material mixture (measured while liquid) from 5 to 6 parts by volume (measured while liquid) of an ammonia-trimethylamine-mixture containing less than 20 per cent by weight of trimethylamine.

3. The process of producing methylamines containing from 1 to 2 methyl groups in the molecule by catalytically reacting, under a pressure above 50 atmospheres and at a temperature between about 300° and about 450° C. in the vapor phase, ammonia with a compound of the formula $CH_3—O—R$, R being one of the group consisting of hydrogen and methyl, which comprises adding before the reaction to each part by volume of the starting material mixture (measured while liquid) from 5 to 6 parts by volume (measured while liquid) of an ammonia-trimethylamine-mixture containing less than 20 per cent by weight of trimethylamine.

4. The process of producing methylamines containing from 1 to 2 methyl groups in the molecule by catalytically reacting, under a pressure above 50 atmospheres and at a temperature between about 300° and about 450° C. in the vapor phase, ammonia with a compound of the formula $CH_3—O—R$, R being one of the group consisting of hydrogen and methyl, which comprises adding before the reaction to each part by volume of the starting material mixture measured while liquid) from 5 to 6 parts by volume (measured while liquid) of an ammonia-trimethylamine-mixture containing less than 20 per cent by weight of trimethylamine, subjecting the reaction mixture to fractional distillation thus separating out the water formed, a mixture of mono and dimethylamine, and a mixture of ammonia and trimethylamine which has about the same composition as the mixture added.

5. The process of producing methylamines containing from 1 to 2 methyl groups in the molecule by catalytically reacting, under a pressure above 50 atmospheres and at a temperature between about 300° and about 450° C. in the vapor phase, ammonia with a compound of the formula $CH_3—O—R$, R being one of the group consisting of hydrogen and methyl, which comprises adding before the reaction to each part by volume of the starting material mixture (measured while liquid) from 5 to 6 parts by volume (measured while liquid) of an ammonia-trimethylamine-mixture containing less than 20 per cent by weight of trimethylamine, subjecting the reaction mixture to fractional distillation under superatmospheric pressure thus separating out the water formed, a mixture of mono and dimethylamine, and a mixture of ammonia and trimethylamine which has about the same composition as the mixture added.

6. The process of continuously producing methylamines containing from 1 to 2 methyl groups in the molecule by catalytically reacting, under a pressure above 50 atmospheres and at a temperature between about 300° and about 450° in the vapor phase, ammonia with a compound of the formula $CH_3-O-R$, R being one of the group consisting of hydrogen and methyl, which comprises adding before the reaction to each part by volume of the starting material mixture (measured while liquid) from 5 to 6 parts by volume (measured while liquid) of an ammonia-trimethylamine-mixture containing less than 20 per cent by weight of trimethylamine, subjecting the reaction mixture to fractional distillation under superatmospheric pressure thus separating out the water formed, a mixture of mono and dimethylamine, and a mixture of ammonia and trimethylamine which has about the same composition as the mixture added and recycling the latter.

PAUL HEROLD.
KARL SMEYKAL.